United States Patent
Iampietro et al.

(10) Patent No.: US 9,317,176 B2
(45) Date of Patent: Apr. 19, 2016

(54) RENDERING OF CONTENT IN A DEFINED REGION OF A GRAPHICAL USER INTERFACE

(75) Inventors: Michael Iampietro, San Francisco, CA (US); Ramesh P B, Uttar Pradesh (IN); Ram Narain Yadav, Greater Noida (IN); Yogita Bhalla, New Delhi (IN); Steven Johnson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 370 days.

(21) Appl. No.: 12/237,359

(22) Filed: Sep. 24, 2008

(65) Prior Publication Data

US 2009/0158201 A1 Jun. 18, 2009

(30) Foreign Application Priority Data

Sep. 24, 2007 (IN) .......................... 2146/CHE/2007

(51) Int. Cl.
  *G06F 3/048* (2013.01)
  *G06F 3/0481* (2013.01)
  *G06F 17/30* (2006.01)
  *H04N 21/845* (2011.01)

(52) U.S. Cl.
  CPC ...... *G06F 3/04817* (2013.01); *G06F 17/30781* (2013.01); *H04N 21/8455* (2013.01)

(58) Field of Classification Search
  CPC .................. G06F 2212/464; H04N 21/8455; H04N 21/47217; H04N 21/2387; H04N 21/4728
  USPC ......... 715/781, 862, 812, 822, 856, 711, 719, 715/723, 784, 787, 838; 386/239, 278
  See application file for complete search history.

(56) References Cited

U.S. PATENT DOCUMENTS

| | | | | |
|---|---|---|---|---|
| 4,698,625 | A * | 10/1987 | McCaskill et al. | 345/157 |
| 5,760,767 | A * | 6/1998 | Shore et al. | 715/723 |
| 6,693,653 | B1 * | 2/2004 | Pauly | 715/857 |
| 7,458,025 | B2 * | 11/2008 | Crow et al. | 715/723 |
| 2006/0245504 | A1 * | 11/2006 | Ogikubo et al. | 375/240.25 |
| 2006/0259877 | A1 * | 11/2006 | Kaminagayoshi | 715/858 |
| 2007/0101292 | A1 * | 5/2007 | Kupka | 715/810 |
| 2008/0034325 | A1 * | 2/2008 | Ording | 715/838 |
| 2008/0263448 | A1 * | 10/2008 | Oppenheimer | 715/719 |
| 2009/0030991 | A1 * | 1/2009 | Vakkalanka | 709/206 |
| 2009/0049385 | A1 * | 2/2009 | Blinnikka et al. | 715/719 |

* cited by examiner

*Primary Examiner* — Alvin Tan
*Assistant Examiner* — Rinna Yi
(74) *Attorney, Agent, or Firm* — Kilpatrick Townsend & Stockton LLP (57) ABSTRACT

Rendering content in a graphical user interface (GUI) is disclosed. A region of a GUI is defined as a graphical object. The graphical object corresponds to content. Input is received from an input device. The received input identifies a location on the GUI. The location is in spatial proximity to the defined region of a graphical object. In response to receiving such input, the content corresponding to the graphical object is rendered in the defined region of the GUI. The content may be rendered only in a subset of the defined region of the GUI. Further input, such as input corresponding to a particular location on the GUI, or input corresponding to a change in locations on the GUI in a particular direction, may be received, causing one or more commands to be executed on the rendered content.

11 Claims, 10 Drawing Sheets

RENDERING OF CONTENT IN A DEFINED REGION OF A GRAPHICAL USER INTERFACE

CROSS REFERENCE TO RELATED APPLICATIONS

The present application claims the benefit of Indian Patent Application No. 2146/CHE/2007, filed on Sep. 24, 2007, which is incorporated herein by reference in its entirety.

BACKGROUND

Conventional computerized devices, such as personal computers, laptop computers, and the like utilize graphical user interface in applications such as operating systems and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects and/or provide commands on a computer display. The user may operate the input device (for example, a mouse) to move a corresponding indicator (for example, a pointer icon) onto a graphical object shown on the graphical user interface. The user may then select and move the graphical object, by further operation of the input device, or invoke an operating system command or other application through operation of the input device.

By utilizing graphical user interface technology, a software application may be created that allows users to create and edit documents and/or projects containing multimedia content, such as a collection of video files to be organized into a single presentation for burning to a DVD. The application allows a user to select and place graphical objects, for example icons representing a number of video files, into the document and/or project. Other graphical objects, such as icons representing titles, captions, audio and visual effects, audio files, and so on, may be added, removed, changed, arranged, or otherwise manipulated on the graphical user interface as desired. In this way, users may quickly and easily create and edit multimedia projects.

Content creation and editing applications typically allow the user to view the content on the computer display, both the finished project as well as the content components that comprise the finished project. For example, a user may operate the input device to select a graphical object corresponding to a file including video. The user may then further operate the input device to provide a command to the application that causes the application to invoke a playback application in a separate graphical user interface, in which the user is able to view the video. This separate graphical user interface may be, in the language of the Microsoft® Windows® operating system, a window that contains the playback application. Some applications cause the window to "pop up" in relation to the selected graphical object, at which point the playback application executes to play the video file.

SUMMARY

Conventional technologies for rendering content in a graphical user interface, particularly one designed for the creation and editing of multimedia projects, suffer from a variety of deficiencies. When a user is creating a multimedia project that includes a large number of video clips, to preview any of those clips, the user must find the icon or other graphical object representing the clip of interest. Then the user must perform a number of actions, such as selecting the clip with an input device (e.g., a mouse), and then double-clicking the clip, or "right-clicking" on the clip with the mouse and then selecting a command from a resulting pop-up menu, in order to preview the clip. Further, such actions cause the operating system to open a separate window or other display unit on the graphical user interface for the video clip to play in, using up more processing resources. If the user is looking for one particular video clip out of many video clips, this becomes a time-consuming process. The user must select a clip that may be the desired clip, tell the application to play the clip, and if the clip is not the desired clip, the user must then close the pop-up window or other display unit in which the clip was played, or otherwise bring the window containing the multimedia project application back in front of the pop-up window, and begin the entire process again. If the user needs to tell the playback application to perform further commands on the video clip, such as jumping to a particular point in time in the clip, adjusting the playback volume level, and so on, that adds further actions the user must take with the input device. Additionally, if the user does not take the time and effort to close each pop-up window after playing some portion of a number of clips, the display is going to be cluttered with pop-up windows in addition to the window containing the multimedia project graphical user interface, making it harder for the user to perform other tasks related to the multimedia project while simultaneously previewing a video clip.

Embodiments of the invention significantly overcome such problems by rendering content related to a graphical object in a region that defines the graphical object. On a graphical user interface, a graphical object is defined by a region of the graphical user interface. The region may be of any size, so long as the region is able to be shown on the graphical user interface. The graphical object corresponds to content (such as a video file). Input may then be received from an input device (such as a mouse) that identifies a location on the graphical user interface in spatial proximity to the defined region of the graphical object. That is, for example in some embodiments, a user may move the mouse so that the mouse pointer corresponding to the mouse is located on the graphical user interface either very near, or at least partially overlapping, the graphical object. This location is then received as input, and in response, the content corresponding to that graphical object is rendered in the graphical object. In other words, in an example of one embodiment, if the graphical object is a thumbnail icon representing a particular video clip, when a user moves a mouse so that the corresponding mouse point is near or partially overlapping that thumbnail icon, the video clip is played in the thumbnail icon.

Further input may be provided from the input device as a way of executing other commands on the rendered content. For example, when the input device is a mouse, by moving the mouse (and, corresponding, the mouse pointer on the graphical user interface) in one direction, a certain command may execute. Moving the mouse in a different direction may cause a different command to execute. That is, a user may move the mouse from left to right in a horizontal direction, causing playback of the rendered content to speed up, while moving the mouse in the opposite horizontal direction causes playback to slowdown. Simply providing another location on the graphical user interface may also serve as further input. For example, the defined region of the graphical object may be divided up and related to the content to be rendered such that the location on the graphical user interface received as input corresponds to a certain point in time in the rendered content. The content would then be rendered starting from that point in time. Changing the location provided as input in a certain way cause the content to skip ahead to a later point in time; changing the location in another way could cause the content to go back to an earlier point in time. A variety of combinations of input received and commands is possible.

More particularly, in an embodiment there is provided a method of rendering content in a graphical user interface. The method includes defining a region of the graphical user interface as a graphical object. The graphical object corresponds to content. Input is received from an input device. The received input identifies a location on the graphical user interface in spatial proximity to the defined region of a graphical object. In response in receiving input, the content corresponding to the graphical object in the defined region of the graphical user interface is rendered.

In a related embodiment, the method may include receiving further input from the input device that results in execution of a command on the rendered content. In a further related embodiment, receiving further input may include receiving further input from the input device, the further input indicating a change in location on the graphical user interface in a direction, resulting in execution of a command on the rendered content, the command corresponding to the direction. In another further related embodiment, receiving further input may include receiving further input from the input device, the further input indicating a first change in locations on the graphical user interface in a first direction and a second change in locations on the graphical user interface in a second direction, resulting in execution of a first command and a second command on the rendered content, the first command corresponding to the first direction, the second command corresponding to the second direction.

In another related embodiment, the method may include associating locations within the defined region with commands executable on the rendered content. The method may also include receiving further input from the input device, the further input identifying a location in the defined region in spatial proximity to an associated location; and in response, executing the command associated with the associated location.

In still another related embodiment, the method may include associating sections of the defined region with portions of the content. Rendering may then include, if the identified location is in an associated section of the defined region, rendering the content corresponding to the graphical object in the defined region of the graphical user interface, beginning from a portion of the content associated with that section.

In yet another related embodiment, the method may include receiving further input from the input device, the further input indicating a change in locations on the graphical user interface in a direction, the change in locations occurring within a section of the defined region, resulting in execution of a command on the rendered content, the command corresponding to the direction of the change in locations and the section in which the change occurred.

In yet still another related embodiment, rendering may include, in response, rendering the content corresponding to the graphical object in only a subset of the defined region of the graphical user interface.

In still yet another related embodiment, the method may include displaying an indicator related to the input device, wherein the indicator is displayed on the graphical user interface at the location identified by the input received from the input device. The method may also include during rendering of the content, displaying only an outline of the indicator on the graphical user interface.

In yet another related embodiment, the method may include receiving further input from the input device that identifies a location on the graphical user interface not in spatial proximity to the defined region; and in response, ceasing to render the content.

In another embodiment, there is provided a computer program product, stored on computer readable medium, to render content in a graphical user interface. The computer program product includes computer program code for defining a region of the graphical user interface as a graphical object. The graphical object corresponds to content. The computer program product also includes computer program code for receiving input from an input device. The received input identifies a location on the graphical user interface in spatial proximity to the defined region of a graphical object. The computer program product also include computer program code for, in response in receiving input, rendering the content corresponding to the graphical object in the defined region of the graphical user interface.

In another embodiment, there is provided a computer system. The computer system includes a memory; a processor; a display; an input device; and an interconnection mechanism coupling the memory, the processor, the display, and the input device, allowing communication there between. The memory is encoded with a rendering application, that when executed in the processor, provides a rendering process that renders content in a graphical interface. The rendering process causes the computer system to perform the operations of defining a region of the graphical user interface as a graphical object. The graphical object corresponds to content. The computer system also performs operations of receiving input from an input device. The received input identifies a location on the graphical user interface in spatial proximity to the defined region of a graphical object. In response in receiving input, the computer system also performs operations of rendering the content corresponding to the graphical object in the defined region of the graphical user interface.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Incorporated, of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 10:
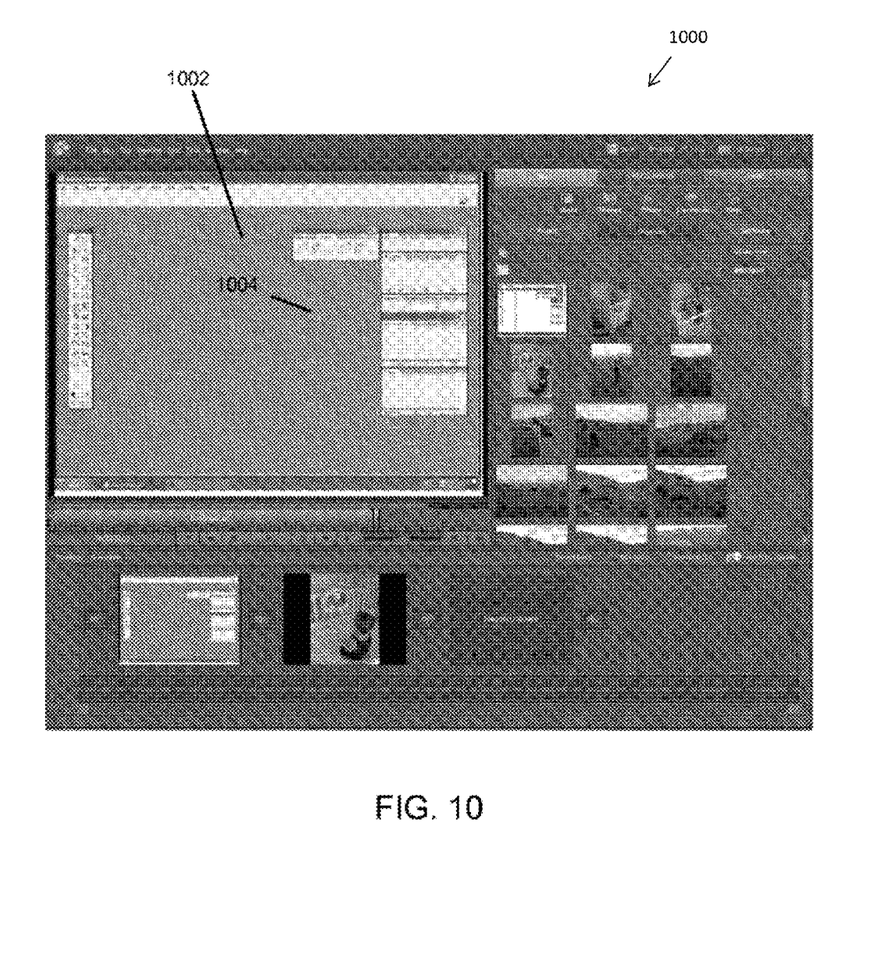
FIG. 10 is an example screenshot according to an embodiment of the invention.

Generally, disclosed embodiments include methods and apparatus for rendering content in a graphical user interface, and executing commands on the rendered content by manipulating an input device. Some region of the graphical user interface is defined as a graphical object; in one example, a graphical object is a thumbnail icon. In another example, a graphical object is a larger icon. There may be a number of such defined regions (and thus a number of graphical objects) on the graphical user interface, each one distinct from the next. Each graphical object corresponds to some type of content. In one embodiment, the content may be multimedia content, such as a video file. Input is then received from an input device. In one embodiment, for example, this input may be the location of an indicator on the graphical user interface. In other words, in one example, the input may the location of a mouse pointer, which is provided from a mouse controlled by a user. If the location is in a spatial proximity to a defined region, for example if the location of the mouse pointer on the graphical user interface is near, or overlapping any part of, a graphical object, the content corresponding to the graphical object is rendered in the defined region of that graphical object. In this way, it is possible for a user to, for example, preview a video clip by simply moving a mouse pointer or other indicator over the thumbnail icon corresponding to the clip, at which point the video clip is rendered in that icon. An example of this is shown in FIG. 10, which is an example screenshot according to one embodiment of the invention. On the graphical user interface 1000, content is being rendered in the defined region 1002 because a mouse pointer 1004 is located within the defined region. Were the mouse pointer 1004 to no longer be within, or in a spatial proximity to, the defined region 1002, instead of the content being rendered, the graphical object corresponding to the content would be shown.

Figure 1:
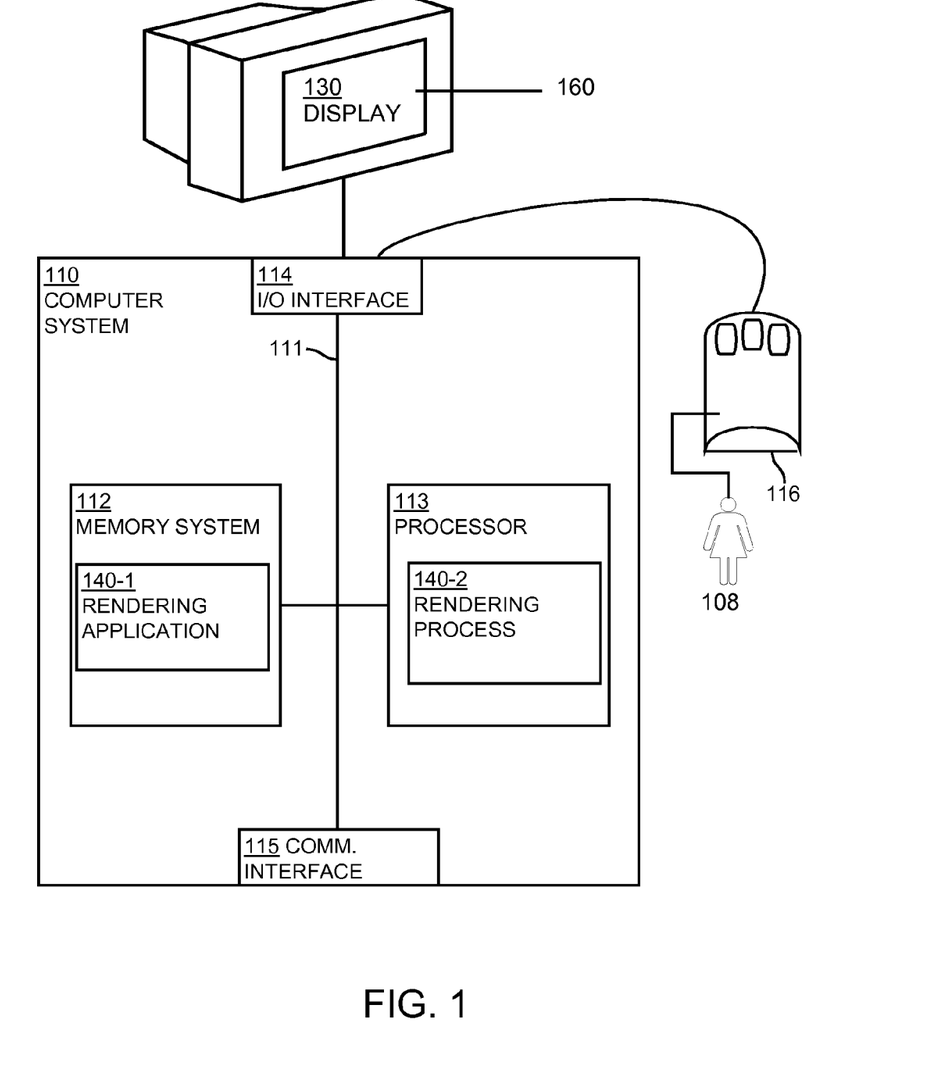
FIG. 1 shows a high-level block diagram of a computer system according to one embodiment disclosed herein.

FIG. 1 is a block diagram illustrating example architecture of a computer system 110 that executes, runs, interprets, operates or otherwise performs a rendering application 140-1 and a rendering process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108 such as a person who edits digital video files to provide input commands and generally control a graphical user interface 160 shown on a display 130. The communications interface 115 enables the computer system 110 to communicate with other devices (e.g., other computers) on a network (not shown in FIG. 1).

The memory system 112 is any type of computer readable medium and in this example is encoded with a rendering application 140-1. The rendering application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the rendering application 140-1. Execution of the rendering application 140-1 in this manner produces processing functionality in a rendering process 140-2. In other words, the rendering process 140-2 represents one or more portions or runtime instances of the rendering application 140-1 performing or executing within or upon the processor 113 in the computer system 110 at runtime.

Generally, while operating the computer system 110, the user 108 manipulates at least one input device 116, such as a computer mouse. Through the manipulation of the at least one input device 116, the user 108 may provide input to a graphical user interface 160 (though otherwise not shown in detail). For example, the user 108 might engage the rendering application 140-1 by moving the mouse so that a pointer associated with the mouse that is shown on the graphical user interface is located in spatial proximity to a graphical object, such as an icon representing a video file. The rendering application, executing as the rendering process 140-2, receives input, such as through signals, indicating a location on the graphical user interface corresponding to the location of the pointer on the graphical user interface, and operates as explained below to render the video file on the graphical user interface.

It is noted that example configurations disclosed herein include the rendering application 140-1 itself including the rendering process 140-2 (i.e., in the form of un-executed or non-performing logic instructions and/or data). The rendering application 140-1 may be stored on a computer readable medium (such as a floppy disk), hard disk, electronic, magnetic, optical or other computer readable medium. The rendering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the rendering application 140-1 in the processor 113 as the rendering process 140-2. Those skilled in the art will understand that the computer system 110 may include other processes and/or software and hardware components, such as an operating system not shown in this example.

The display 130 need not be coupled directly to computer system 110. For example, the rendering application 140-1 may be executed on a remotely accessible computerized device via the network interface 115. In this instance, the graphical user interface 160 may be displayed locally to a user of the remote computer and execution of the processing herein may be client-server based.

FIGS. 2-9 are flowcharts of various embodiments of the rendering process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
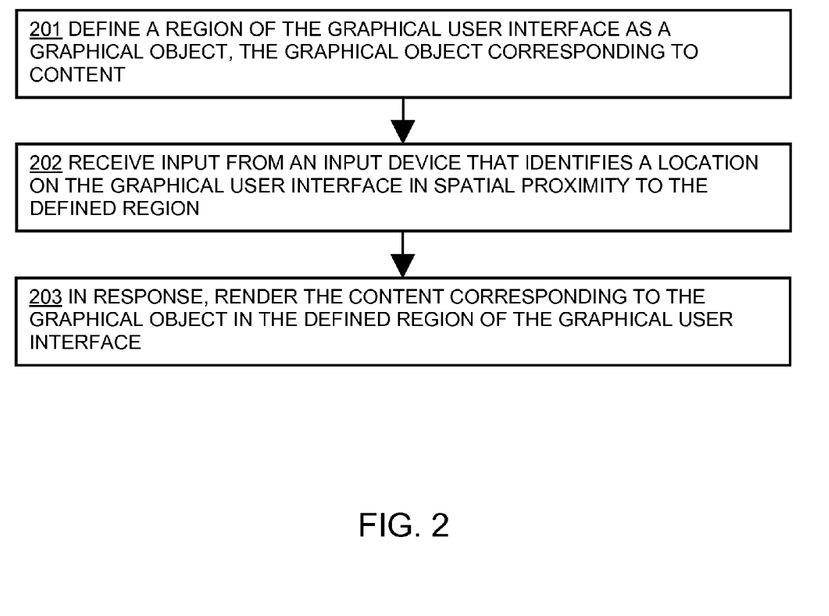
FIG. 2 illustrates a flowchart of a procedure performed by the system of FIG. 1 when rendering content in a graphical user interface.

FIG. 2 illustrates an embodiment of the rendering application 140-1, executing as the rendering process 140-2. The rendering process 140-2 defines a region of the graphical user interface as a graphical object, step 201. The graphical object corresponds to content. The content may be stored within the memory system 112 (shown in FIG. 1) or in a different storage location (not shown) accessible by the rendering process 140-2 through the input/output interface 114 or the communications interface 115. The content may be any type of content, but in a preferred embodiment, is multimedia content including at least a portion of video data.

The rendering process 140-2 may create any number of graphical objects by defining a number of regions on the graphical user interface. The rendering process must then track each defined region so that no defined region overlaps another defined region. A defined region may be of any size, but must fit on the graphical user interface. The user may select the size of a defined region, or the rendering process 140-2 may include a preset size, or otherwise be predetermined (such as depending on the size of the graphical user interface as measured by the rendering process 140-2 upon initial execution of the rendering process 140-2). In some embodiments, the size of a defined region may not exceed either a minimum or a maximum value, or both, as is discussed further below. Note that different objects may have defined regions of different sizes, either by definition (for example, based on the corresponding content, or preset within the rendering process 140-2) or through user selection.

Next, the rendering process 140-2 receives input from an input device, step 202. The input identifies a location on the graphical user interface in spatial proximity to the defined region of a graphical object. That is, the location identified by the received input must be within some range of the defined region, or must be at least partially overlapping the defined region. The necessary range may be predefined within the rendering process 140-2, or may be determined by the rendering process 140-2 based on the size of the defined region, the size of the graphical user interface, or some combination thereof. As is discussed in greater detail below, the identified location on the graphical user interface may be marked by an indicator displayed on the graphical user interface.

Finally, the rendering process 140-2, in response to receiving the input, renders the content corresponding to the graphical object in the defined region of the graphical user interface, step 203. Note that the rendering process 140-2 may render content solely in the defined region (or a subset thereof, as is discussed further below). Alternatively, the rendering process 140-2 may render content partially in the defined region and partially out of the defined region. One such example may be if the rendering process 140-2 renders content in a "tool tip" type of pop-up. Such a pop-up differs from a typical pop-up window in that typical operating system commands for a window (such as minimize, maximize, and close) are not found in a tool tip. Rather, a tool tip type pop-up only appears if the identified location from the received input is in a spatial proximity to the defined region.

A timer (not shown in FIG. 1) may be used by the rendering process 140-2 to determine if content should be rendered, as a supplement to the received input. For example, upon receiving input identifying a location within the defined region of a particular graphical object, the rendering process may start a timer that runs for a pre-determined length of time. When the timer stops running (i.e., when the pre-determined length of time is reached), the rendering process 140-2 may begin rendering content, provided that all input received by the rendering process 140-2 during that length of time is input that identifies a location on the graphical user interface that is within the defined region. If not, then the timer is reset, and does not activate again until appropriate input (i.e., identifying a location within the defined region of that graphical object) is received. In other words, as further input is received while the timer is running, the rendering process 140-2 determines whether or not the identified location from that further input is also located within the defined region of the graphical object. If so, then the timer runs to completion, at which point the rendering process 140-2 begins rendering content.

Use of the timer helps to prevent the rendering process 140-2 from having to render content that a user does not want rendered. For example, if the graphical user interface contains a number of graphical objects closely grouped together, as a user navigates the graphical user interface via the input device, the rendering process 140-2 is likely to receive input identifying locations within defined regions of a number of graphical objects. In embodiments where the input device is a mouse with a corresponding pointer displayed on the graphical user interface, as the user manipulates the mouse, the pointer correspondingly moves. The pointer may need to "pass over" graphical objects that are of no interest to the user in order for the pointer to reach a graphical object that is of interest to the user. If the rendering process 140-2 had to render the content associated with each of those graphical objects, this would be an inefficient use of resources, and would likely cause frustration to the user.

Figure 3:
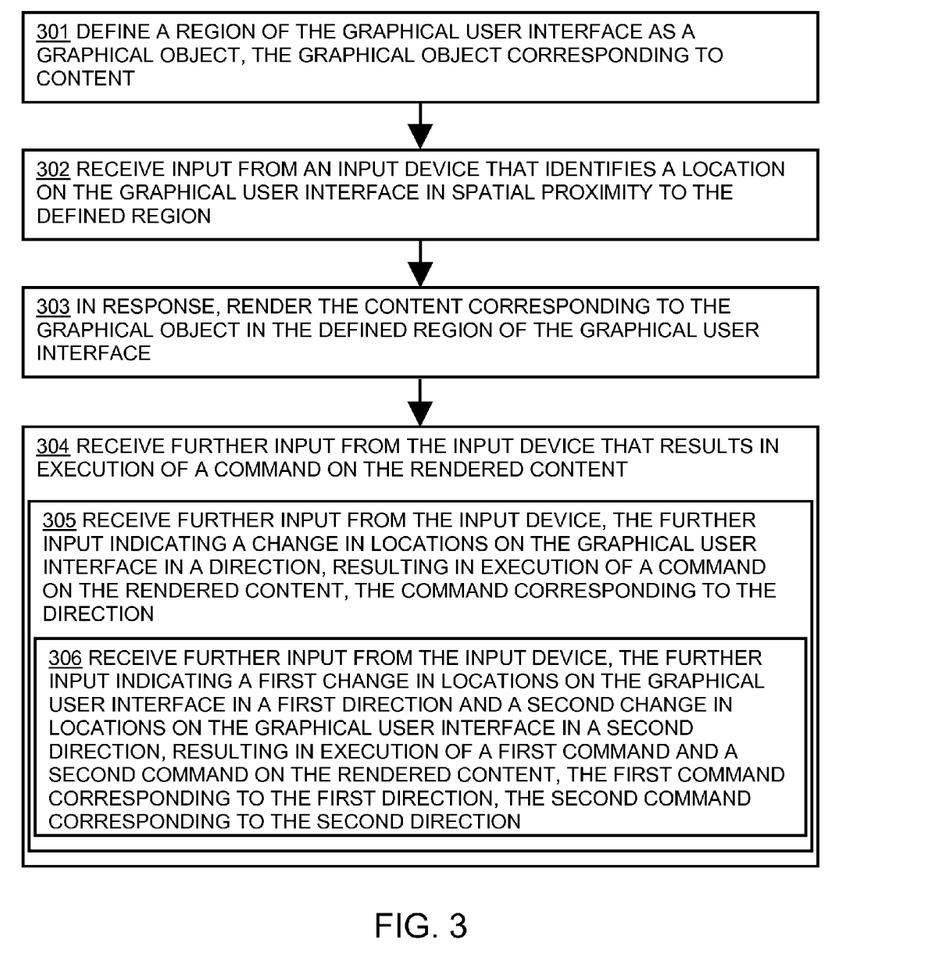
FIG. 3 illustrates a flowchart of a procedure performed by the system of FIG. 1 when receiving further input regarding changes in direction and executing one or more commands on the rendered content as a result.

FIGS. 3-6 illustrate how the rendering process 140-2 receives further input from the input device that causes one or more commands to be executed on the rendered content, depending on a location on the graphical user interface, a direction of change in locations or multiple directions, or some combination of all of the above. In FIG. 3, the rendering process 140-2 receives further input that relates to one or more direction(s) of change in locations on the graphical user interface. The rendering process 140-2 first defines a region of the graphical user interface as a graphical object, step 301, where the graphical object corresponds to content. The region may defined in any way described herein. Next, the rendering process 140-2 receives input from an input device, step 302. The input identifies a location on the graphical user interface in spatial proximity to the defined region of a graphical object. The rendering process tracks this location so that changes in the location may be interpreted accordingly, as is discussed herein. In response to receiving the input, the rendering process 140-2 renders the content corresponding to the graphical object in the defined region of the graphical user interface, step 303.

While the rendering process 140-2 renders the content, the rendering process 140-2 may receive further input from the input device, step 304. This further input results in execution of a command on the rendered content. For example, the further input may cause the rendered content to be played more quickly or slowly, or for playing of the rendered content to be paused or stopped altogether. If the content includes audio, the further input may cause a change in the volume level of the audio. If the defined region may be adjusted by a user, the further input may cause such an adjustment. Viewing qualities, such as the sharpness, contrast, brightness, color scheme, and so forth of any video portion of the content may be adjusted. Particular sections of the content may be skipped to, so that those sections are rendered. In sum, any command that may be executed on rendered content may be programmed to be executed according to a particular further input received by the rendering process 140-2.

In some embodiments, the rendering process 140-2 may receive further input from the input device that indicates a change in locations on the graphical user interface in a direction, resulting in execution of a command on the rendered content, the command corresponding to the direction, step 305. For example, in some embodiments, the change in locations on the graphical user interface may be in a horizontal, or substantially horizontal, direction, either to the right or to the left. A particular command may be associated with a change in horizontal direction from left to right, and a different command may be associated with a change in horizontal direction from right to left. Alternatively, the relevant change in direction might by a change in vertical direction, either from top to bottom, or bottom to top. Of course, other changes in direction (such as diagonal changes in direction along any number of angles and in any number of orientations) may additionally or alternatively be used as well. The association of a change in direction and a command may be preset within the rendering process 140-2, or the rendering process 140-2 may allow a user to configure the association(s).

Additionally, or alternatively, in some embodiments, the rendering process 140-2 may receive further input from the input device that indicates a first change in locations on the graphical user interface in a first direction and a second change in locations on the graphical user interface in a second direction, step 306. This results in execution of a first command and a second command on the rendered content, the first command corresponding to the first direction, the second command corresponding to the second direction. The directions may again be horizontal, vertical, or diagonal along any number of angles, and may be in any orientation. Further, as discussed above, the command associated with each potential change in direction and/or orientation may be initially defined within the rendering process 140-2 or may be set by a user. Note further that the number of direction changes may be greater than two, such as first changing direction from horizontal left to horizontal right, then changing direction from vertical down to vertical up, and then changing direction from horizontal right to horizontal left. Each subsequent change in direction may result in the execution of a corresponding command. Alternatively, or additionally, the changes in direction may, in total, correspond to a single command, again preset within the rendering process 140-2 or definable by a user.

Figure 4:
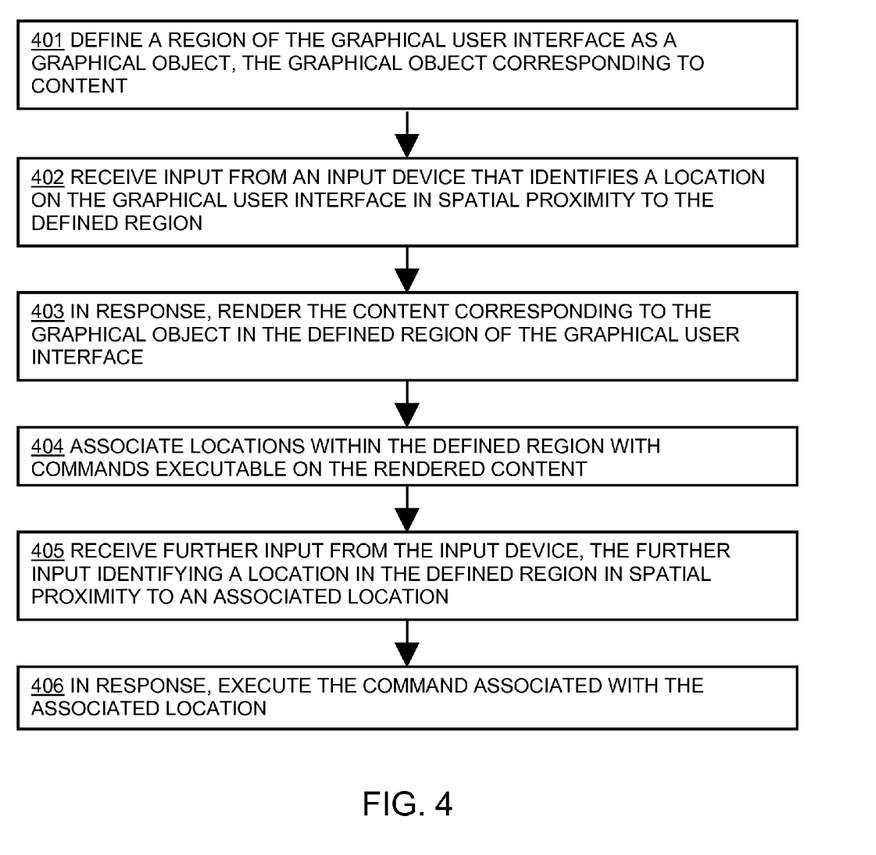
FIG. 4 illustrates a flowchart of a procedure performed by the system of FIG. 1 when receiving input of a location on the graphical user interface in spatial proximity to a location with an associated command, and executing that command on the rendered content as a result.

FIG. 4 illustrates the rendering process 140-2 executing commands on rendered content based on received input that relates to a particular location in the defined region. The rendering process 140-2 defines a region of the graphical user interface as a graphical object, step 401. The graphical object corresponds to content. Next, the rendering process 140-2 receives input from an input device, step 402. The input identifies a location on the graphical user interface in spatial proximity to the defined region of a graphical object. The rendering process 140-2 then, in response to receiving the input, renders the content corresponding to the graphical object in the defined region of the graphical user interface, step 403.

After a region is defined as a graphical object, the rendering process 140-2 may associate locations within the defined region with commands executable on the rendered content, step 404. Any location of any size within the defined region may be associated with any command. For example, if the defined region is a quadrilateral shape, the rendering process 140-2 may associate each of the four corners of the quadrilateral with a different command. The upper right corner may be associated with fast forward, the upper left corner may be associated with rewind, the lower right corner may be associated with slow, and the lower left corner may be associated with pause. This is just one of a number of combinations of locations and commands that are possible, depending upon the size of the defined region, the shape of the defined region, and the number of commands available to be executed on rendered content. The associations between particular locations and commands may be predefined within the rendering process 140-2, or the rendering process 140-2 may allow a user to set the associations as desired.

The rendering process 140-2 may then later receive further input from the input device, the further input identifying a location in the defined region in spatial proximity to an associated location, step 405. In response, the rendering process 140-2 executes the command associated with the associated location, step 406. Using the above example, if the rendering process 140-2 receives further input that identifies a location in the upper right corner of the defined region, because that is an associated region with an associated command, the rendering process 140-2 will execute the fast forward command, and advance the rendered content.

Figure 5:
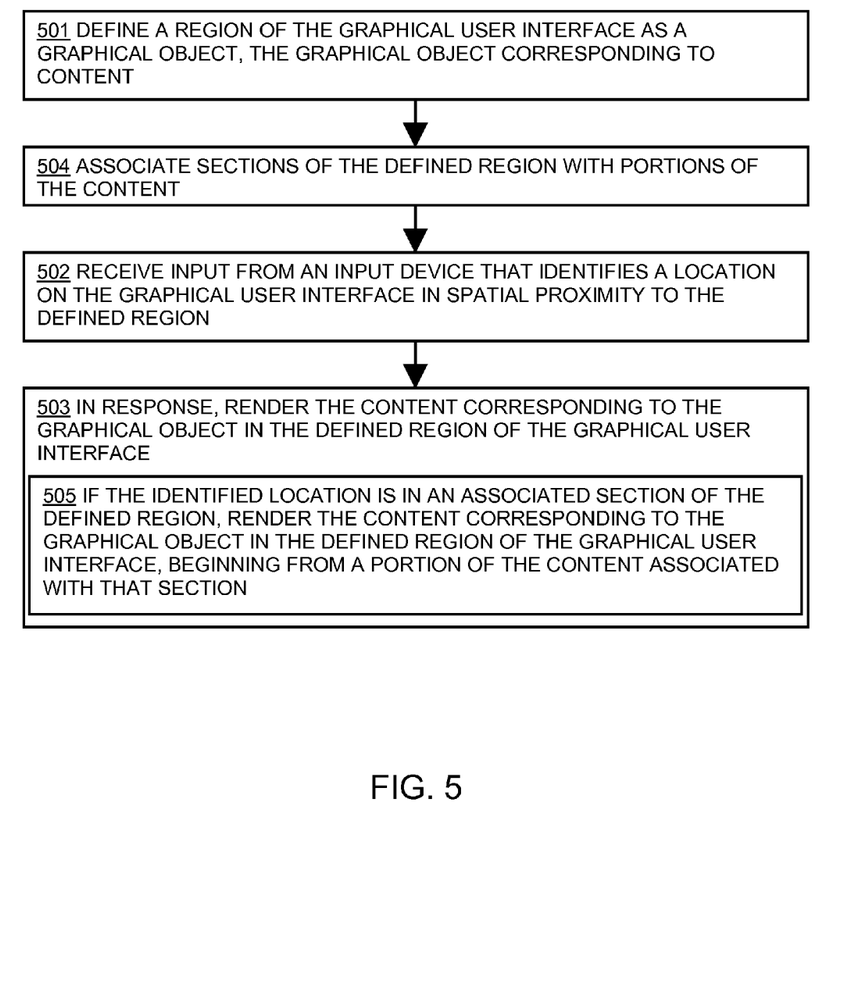
FIG. 5 illustrates a flowchart of a procedure performed by the system of FIG. 1 when rendering content from a portion of the content corresponding to input of a location on the graphical user interface.

In FIG. 5, input received by the rendering process 140-2 identifying a location on the graphical user interface causes the rendering process 140-2 to render content starting with a particular portion of content that relates to the identified location. The rendering process 140-2 first defines a region of the graphical user interface as a graphical object, step 501, where the graphical object corresponds to content. The rendering process 140-2 then receives input from an input device, step 502, that identifies a location on the graphical user interface in spatial proximity to the defined region of a graphical object.

The rendering process 140-2 next associates sections of the defined region with portions of the content, step 504. The rendering process 140-2 may determine and define sections of the defined region in any number of ways. For example, the rendering process may determine the size and shape of the defined region, and may then gather information about the content corresponding to the graphical object of the defined region. For example, the defined region may be square in shape and have a size of 20 pixels by 20 pixels, while the content may be 2 minutes long. The rendering process 140-2 may define a section of the defined region to be a column of pixels that is one pixel wide, with each column corresponding to a six second portion of the content. The sections maybe of any shape and size, including horizontal sections, vertical sections, and diagonal sections, and of any length, including varying lengths from section to section, as long as at least a part of the section is found within the defined region.

Finally, if the identified location (from the received input) is in an associated section of the defined region, the rendering process 140-2 renders the content corresponding to the graphical object in the defined region of the graphical user interface, beginning from a portion of the content associated with that section, step 503. Using the example given above of the square-shaped defined region of 20 pixels by 20 pixels, if the identified location is in the third column of pixels from the left-hand side of the defined region, the video content will begin playing from the thirteenth second of the video instead of the beginning of the video, step 505. This allows a user to change the current playback location of the content by, for example, moving a mouse pointer to different locations in the defined region. The user may thus, for example, provide further input to the rendering process by moving the mouse pointer from the third column of pixels from the left-hand side of the defined region to the sixth column of pixels from the left-hand side of the defined region, which will cause playback to advance from its current location to the thirty-first second of the video. Moving the mouse pointer an equal distance back towards the left-hand side of the defined region would correspondingly cause playback to resume from the thirteenth second of the video.

Figure 6:
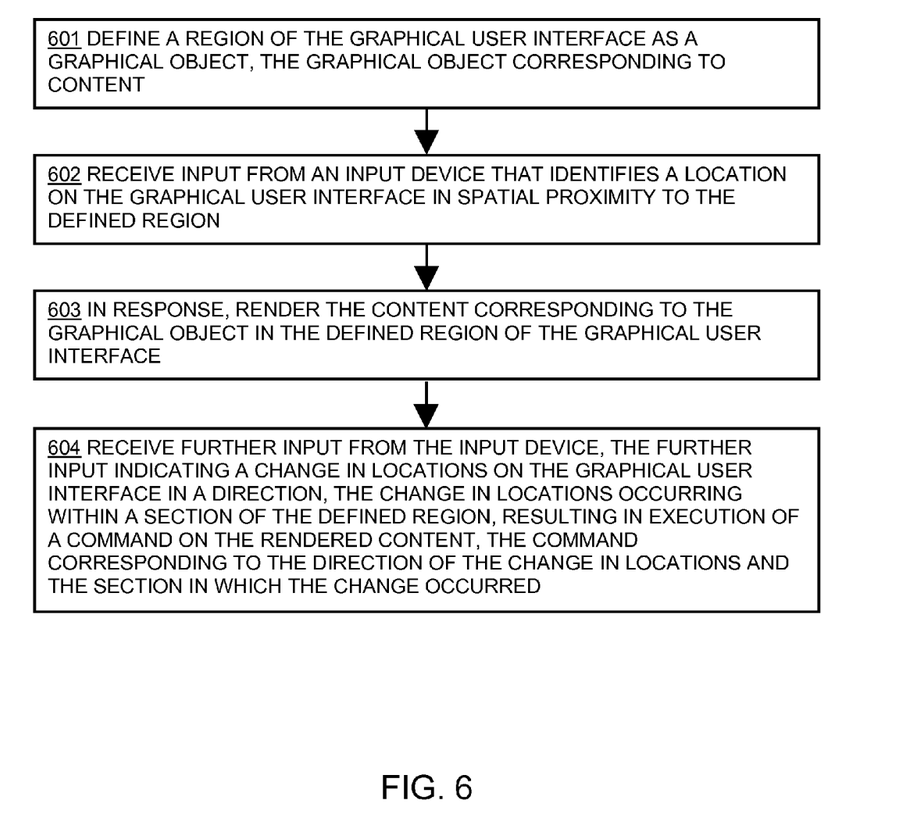
FIG. 6 illustrates a flowchart of a procedure performed by the system of FIG. 1 when executing one or more commands on rendered content as a result of further input including both changes in direction and changes in location.

FIG. 6 illustrates a combination of the above processes, whereby a change in direction in a particular section of the defined region results in the execution of a particular command on the rendered content. The rendering process 140-2 defines a region of the graphical user interface as a graphical object, step 601, where the graphical object corresponds to content. Next, the rendering process 140-2 receives input from an input device, step 602. The input identifies a location on the graphical user interface in spatial proximity to the defined region of a graphical object. Then, the rendering process 140-2, in response to receiving the input, renders the content corresponding to the graphical object in the defined region of the graphical user interface, step 603. The rendering process 140-2 next receives further input from the input device, the further input indicating a change in locations on the graphical user interface in a direction, the change in locations occurring within a section of the defined region, resulting in execution of a command on the rendered content, the command corresponding to the direction of the change in locations and the section in which the change occurred, step 604. The change in direction may be of any type described herein, and the defined region may be divided into any number of sections by any process also described herein. Of course, the command(s) associated with these combinations may be preset within the rendering process 140-2 or may be defined by a user.

Figure 7:
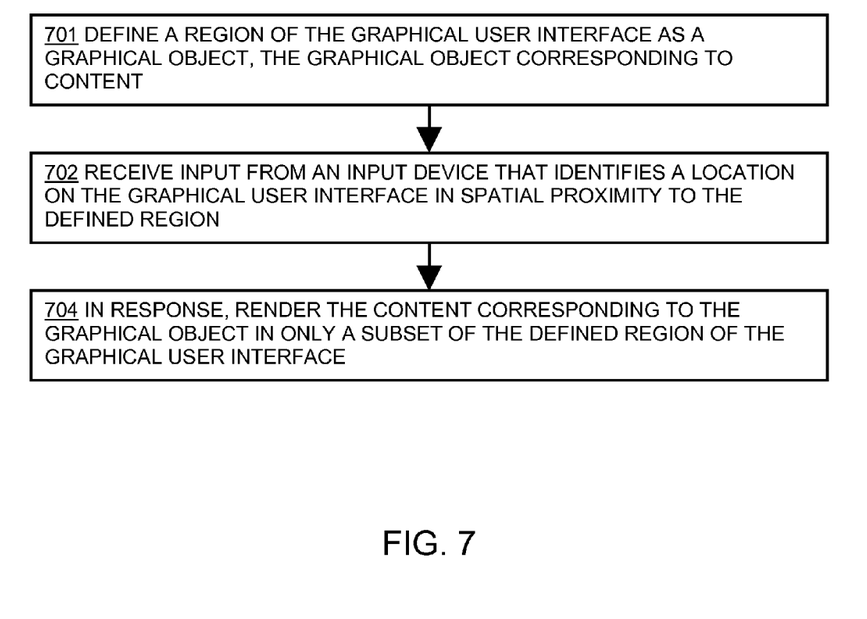
FIG. 7 illustrates a flowchart of a procedure performed by the system of FIG. 1 when rendering content only in a defined region of the graphical user interface.

In FIG. 7, the rendering process 140-2 renders content only in a subset of the defined region. The rendering process 140-2 defines a region of the graphical user interface as a graphical object, step 701. The graphical object corresponds to content. Next, the rendering process 140-2 receives input from an input device, step 702. The input identifies a location on the graphical user interface in spatial proximity to the defined region of a graphical object. Finally, the rendering process 140-2, in response to receiving the input, renders the content corresponding to the graphical object in only a subset of the defined region of the graphical user interface, step 704. A subset is, by definition, any portion of the defined region, including the entirety of the defined region. No content is rendered outside of the defined region, however. This restricts rendering of the content to only that region of the graphical user interface that defines the graphical object. In one embodiment, content is thus rendered only in, for example, the thumbnail icon that corresponds to the content.

If the defined region is defined by the rendering process 140-2 so that it is hard for a user to view rendered content, this may defeat a purpose of the rendering process 140-2. Thus, in some embodiments, the defined region of each graphical object is set to be no smaller than a predetermined minimum size. This predetermined minimum size may be chosen in any of a number of ways. For example, a default minimum size may be used. Alternatively, the rendering process 140-2 may initially detect the size of the window and/or the screen on which the graphical user interface is shown, and then select an appropriate minimum size based on this data, or from a chart or table that includes a variety of "suggested" minimum sizes for each of a number of different window/screen sizes. In other embodiments, instead of having a predetermined minimum size, the rendering process 140-2 may allow a user to select the minimum size of a defined region. The user may then be able to change the minimum size at a later time, adjusting it depending on the particular needs of that user. As a further alternative, the rendering process 140-2 may, as a predetermined function or through the selections of a user, define certain regions to have a different minimum size than certain other regions. For example, a graphical object that corresponds to content including only video may have a first minimum size, while a graphical object that corresponds to content including both audio and video may have a second minimum size, where the first and second minimum sizes differ from each other.

As described above, any of these processes may also be applied to the current size of one or more already-defined regions (and thus graphical objects). Additionally, any of these processes may be used by the rendering process 140-2 to set or change a maximum size setting for one or more defined regions (and thus graphical objects).

Figure 8:
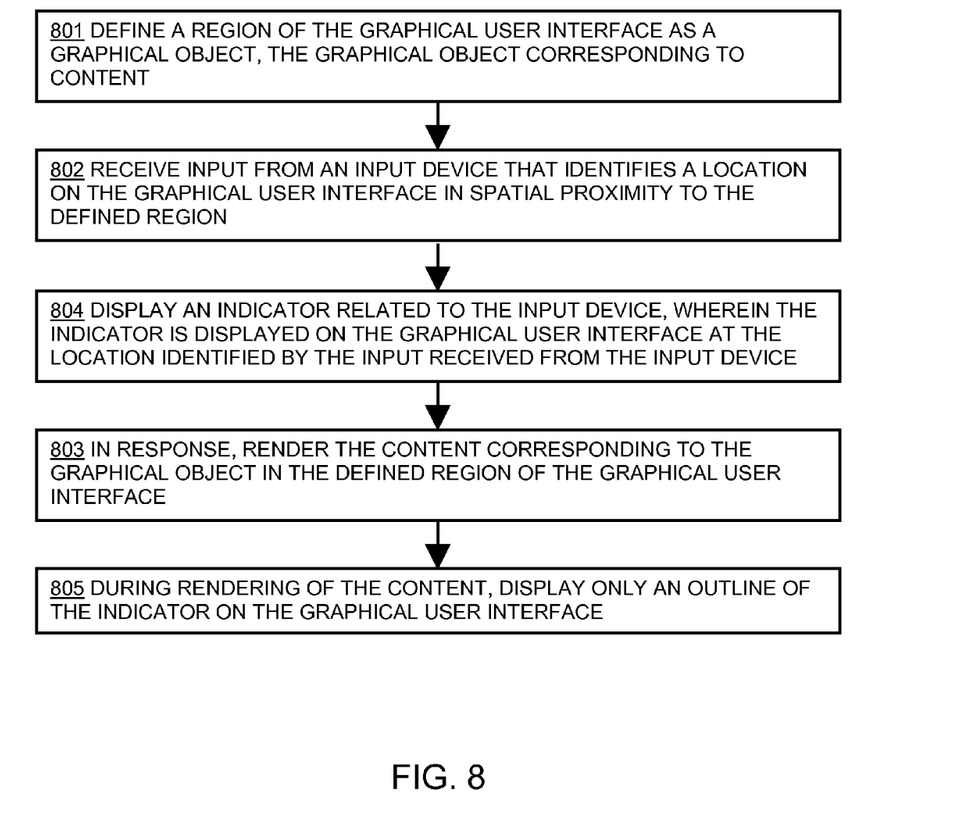
FIG. 8 illustrates a flowchart of a procedure performed by the system of FIG. 1 when displaying an indicator on the graphical user interface during rendering of content.

FIG. 8 illustrates the rendering process 140-2 displaying an indicator related to the input device in such a way that the indicator is still visible on the graphical user interface but does not impede a user's viewing of content being rendered. First, the rendering process 140-2 defines a region of the graphical user interface as a graphical object, step 801, where the graphical object corresponds to content. The rendering process 140-2 next receives input from an input device, step 802. The input identifies a location on the graphical user interface in spatial proximity to the defined region of a graphical object. The rendering process 140-2, in response to receiving the input, renders the content corresponding to the graphical object in the defined region of the graphical user interface, step 803.

The rendering process 140-2 also displaying an indicator related to the input device, step 804. The rendering process 140-2 displays the indicator on the graphical user interface at the location identified by the input received from the input device. In other words, if the input device is, for example, a mouse, the indicator displayed by the rendering process would thus be a mouse pointer, and the mouse pointer will be displayed at the appropriate location on the graphical user interface corresponding to the input received from the mouse. Any appropriate indicator of any size and shape may be used. During rendering of the content, the rendering process 140-2 displays only an outline of the indicator on the graphical user interface, step 805. In the above example, where the indicator is a mouse pointer, which is typically shaped like a slightly bent arrow outlined in black and filled in white, the rendering process 140-2 would remove the white fill color and leave only the black outline, effectively making the pointer transparent but still displaying enough of the indicator so that a user knows where the indicator is on the graphical user interface, and does not have to stop rendering of the content, or execute a command, in order to see the indicator. In this way, the displayed indicator does not impede a user's viewing of the rendered content, but the user is still to see the location of the indicator, and is thus able to, for example, execute commands on the rendered content by providing further input (and correspondingly causing a change in the location of the indicator on the graphical user interface).

Figure 9:
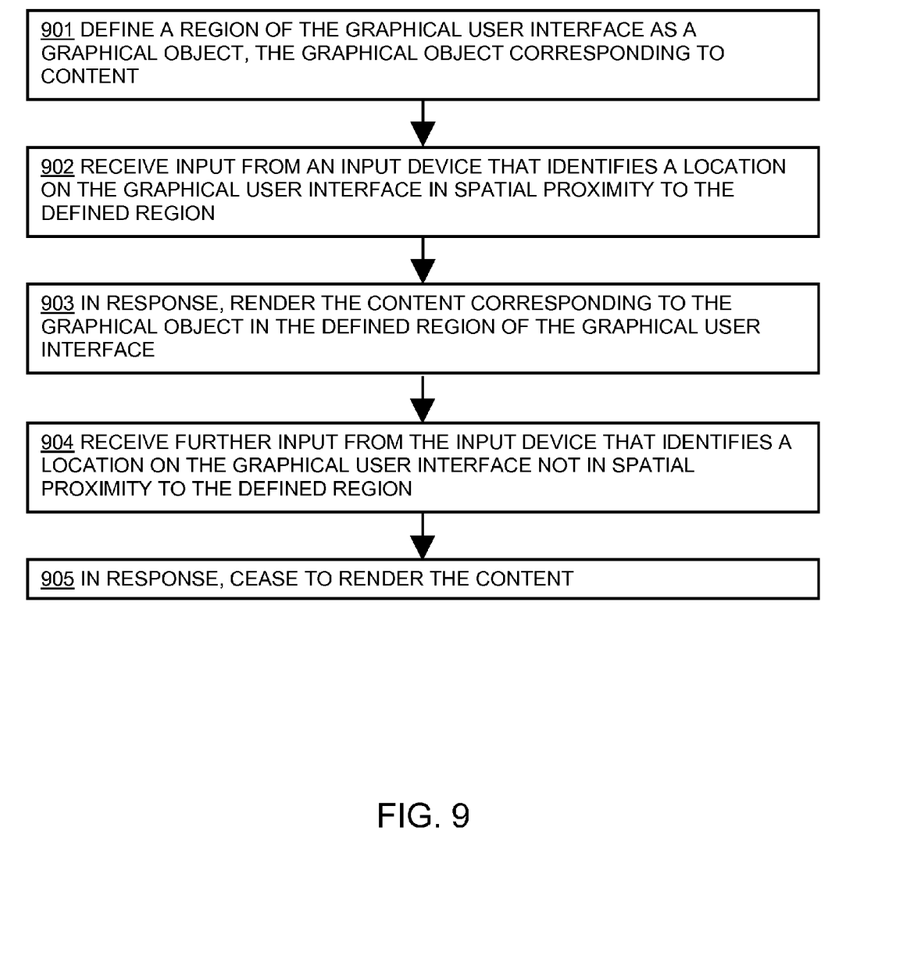
FIG. 9 illustrates a flowchart of a procedure performed by the system of FIG. 1 when ceasing to render content on the graphical user interface.

In FIG. 9, the rendering process 140-2 stops rendering content on the graphical user interface. The rendering process 140-2 first defines a region of the graphical user interface as a graphical object, step 901. The graphical object corresponds to content, as described above. The rendering process 140-2 next receives input from an input device, step 902. This input may be any type of input as described herein. The input identifies a location on the graphical user interface in spatial proximity to the defined region of a graphical object. In response, the rendering process 140-2 renders the content corresponding to the graphical object in the defined region of the graphical user interface, step 903. Should a user viewing the rendered content no long wish to render this particular content, the user may manipulate the input device so that the indicator shown on the graphical user interface corresponding to the input device is no longer in the appropriate spatial proximity to the defined region of the graphical object corresponding to the content being rendered. This causes the rendering process 140-2 to receiving further input from the input device that identifies a location on the graphical user interface not in spatial proximity to the defined region, step 904. In response, the rendering process 140-2 ceases to render the content, step 905. A user is thus able to view different content in a one-at-a-time order by simply manipulating an input device on a graphical user interface from one location in spatial proximity to a graphical object corresponding to content to another location in spatial proximity to a different graphical object corresponding to different content. Further, the user may view as much or as little of the rendered content corresponding to the graphical object based on the location of the input device on the graphical user interface. The user may also choose to manipulate the input device so that the input received identifies a location on the graphical user interface that is not in spatial proximity to any graphical object, which would result in the rendering process 140-2 not rendering any content.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of rendering content in a graphical user interface, comprising:
    displaying, on the graphical user interface, a plurality of icons in defined regions and corresponding to different video data sets, wherein there is a different defined region per icon;
    receiving an input that identifies a particular icon;
    in response to the input, rendering a particular video corresponding to the particular icon, the particular video rendered in the particular defined region in which the particular icon was displayed;
    associating sections of the particular defined region corresponding to the particular icon with respective time segments of the video based on a pixel size of the defined region and a time length of the video;
    while rendering the video, receiving a first further input on the video identifying a particular section of the defined region corresponding to the particular icon; and
    in response to the first further input, executing a first command associated with a time segment of the video associated with the particular section of the defined region corresponding to the particular icon.

2. The method of claim 1, wherein rendering the content comprises:
    rendering the video corresponding to the particular icon only in a portion of the defined region.

3. The method of claim 1, further comprising:
    displaying an indicator related to the input, wherein the indicator is displayed on the graphical user interface at the location identified by the received input; and
    during rendering of the video, displaying only an outline of the indicator on the graphical user interface.

4. The method of claim 1, further comprising:
    receiving additional input that identifies an additional location on the graphical user interface not in spatial proximity to the particular icon; and
    in response, ceasing to render the video.

5. The method of claim 1, wherein associating the sections of the defined region corresponding to the particular icon with corresponding portions of the video is based on a shape of the defined region.

6. The method of claim 1, further comprising:
    receiving a second further input, the second further input indicating a change in location within the particular section of the particular icon and a change in direction; and
    in response to the second further input, executing a second command of a plurality of commands on the rendered video, wherein the second command corresponds to the change in location and the change in direction.

7. The method of claim 1, wherein the input that identifies the particular icon displayed in the defined region comprises a mouse pointer hovering over the particular icon.

8. A computer system comprising:
    a processor;
    a memory system having a rendering application that, when executed by the processor,
    causes the computer system to perform the operation of:
        displaying, on a graphical user interface, a plurality of icons in defined regions and corresponding to different video data sets, wherein there is a different defined region per icon;
        receiving an input that identifies a particular icon;
        in response to the input, rendering a particular video corresponding to the particular icon, the particular video rendered in the particular defined region in which the particular icon was displayed;
        associating sections of the particular defined region corresponding to the particular icon with respective time segments of the video based on a pixel size of the defined region and a time length of the video;
        while rendering the video, receiving a first further input on the video identifying a particular section of the defined region corresponding to the particular icon; and
        in response to the first further input, executing a first command associated with a time segment of the video associated with the particular section of the defined region corresponding to the particular icon.

9. The computer system of claim 8, wherein the rendering application is executable by the processor to execute a command on the rendered video by:
    associating each of the sections of the defined region with at least one of a plurality of commands executable on the rendered video;
    receiving additional input identifying a second particular one of the sections of the defined region; and
    in response to the additional input, executing the command associated with the second particular one of the sections of the defined region.

10. The computer system of claim 8, wherein the rendering application is executable by the processor to render the video by:
    rendering the video corresponding to the particular icon in only in a portion of the defined region.

11. A method of rendering content in a graphical user interface, comprising:
    displaying, on the graphical user interface, a plurality of thumbnail icons in defined regions and, corresponding to different video data sets, wherein there is a different defined region per thumbnail icon;
    receiving input moving a mouse pointer over a particular thumbnail icon;
    in response to the input moving the mouse pointer over the particular thumbnail icon, rendering a particular video corresponding to the particular thumbnail icon, the particular video rendered in the particular defined region in which the particular thumbnail icon was displayed;

associating each of multiple sections of the defined region corresponding to the particular thumbnail icon with a corresponding time segment of the video, wherein a length of time each section is associated with is determined based on a time length of the video and a size of each section is determined based on a size of the defined region;

while rendering the video, receiving a first further input on the video identifying a particular section of the defined region corresponding to the particular thumbnail icon; and in response to the first further input, playing a portion of the video associated with a time segment of the video corresponding to the identified section of the defined region corresponding to the particular thumbnail icon.

* * * * *